United States Patent
Anderson et al.

(10) Patent No.: US 7,328,786 B2
(45) Date of Patent: Feb. 12, 2008

(54) APPARATUS FOR ACCOMMODATING GREATER HEIGHT VARIANCE OF ARTICLES IN SHRINK PACKAGING MACHINE

(75) Inventors: Richard Anderson, Massillon, OH (US); Jeff Bockus, Louisville, OH (US)

(73) Assignee: KPC-Master's Craft International, Inc., Massillon, OH (US)

( * ) Notice: Subject to any disclaimer, the term of this patent is extended or adjusted under 35 U.S.C. 154(b) by 0 days.

(21) Appl. No.: 11/383,765

(22) Filed: May 14, 2006

(65) Prior Publication Data

US 2007/0119691 A1    May 31, 2007

Related U.S. Application Data

(60) Provisional application No. 60/597,346, filed on Nov. 26, 2005.

(51) Int. Cl.
*B65G 13/10* (2006.01)
(52) U.S. Cl. ............ 198/782; 53/439; 53/442; 53/530; 53/557; 198/781.01
(58) Field of Classification Search ........... 198/781.01, 198/782; 53/439, 530, 442, 557
See application file for complete search history.

(56) References Cited

U.S. PATENT DOCUMENTS

| | | |
|---|---|---|
| 2,525,651 A | 10/1950 | Clunan |
| 3,113,874 A | 12/1963 | Baush et al. |
| 3,120,728 A | 2/1964 | Snow, Jr. et al. |
| 3,197,940 A | 8/1965 | Spangler |
| 3,319,394 A | 5/1967 | Talalay et al. |
| 3,340,670 A | 9/1967 | Anderson et al. |
| 3,423,901 A | 1/1969 | Peppler |
| 3,581,876 A | 6/1971 | Keith |
| 3,589,099 A | 6/1971 | James |
| 4,592,193 A | 6/1986 | Gustavsson |
| 5,009,057 A * | 4/1991 | Wilkinson ............ 53/439 |
| 5,339,605 A | 8/1994 | Simpson, Sr. et al. |
| 5,918,653 A * | 7/1999 | Knerr ............ 144/404 |
| 6,158,199 A | 12/2000 | Emery, III et al. |

* cited by examiner

*Primary Examiner*—Gene O. Crawford
*Assistant Examiner*—Kavel Singh
(74) *Attorney, Agent, or Firm*—Tillman Wright, PLLC; Chad D. Tillman; James D. Wright

(57) ABSTRACT

An apparatus for use in a shrink packaging machine for accommodating a greater height variance of articles includes: rollers, each roller including a shaft and a cylinder on the shaft for rotation about an axis of the shaft; and a frame including a pair of parallel side members generally extending in a first, horizontal direction and defining slots receiving opposite ends of the shafts for mounting of the rollers there between. Each of the slots has a slot length that extends in horizontal and vertical directions, and the rollers each generally extends in a third direction orthogonal both to the horizontal and vertical directions. Furthermore, each of the rollers is received within a pair of the slots and is vertically and horizontally displaceable and, when each roller is disposed at its respective lowermost position, the axes of the rollers do not all lie within a horizontal plane.

14 Claims, 14 Drawing Sheets

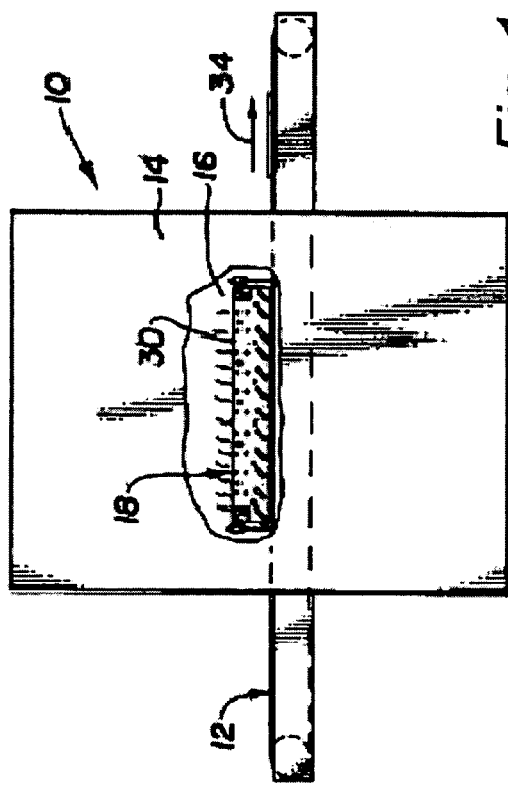
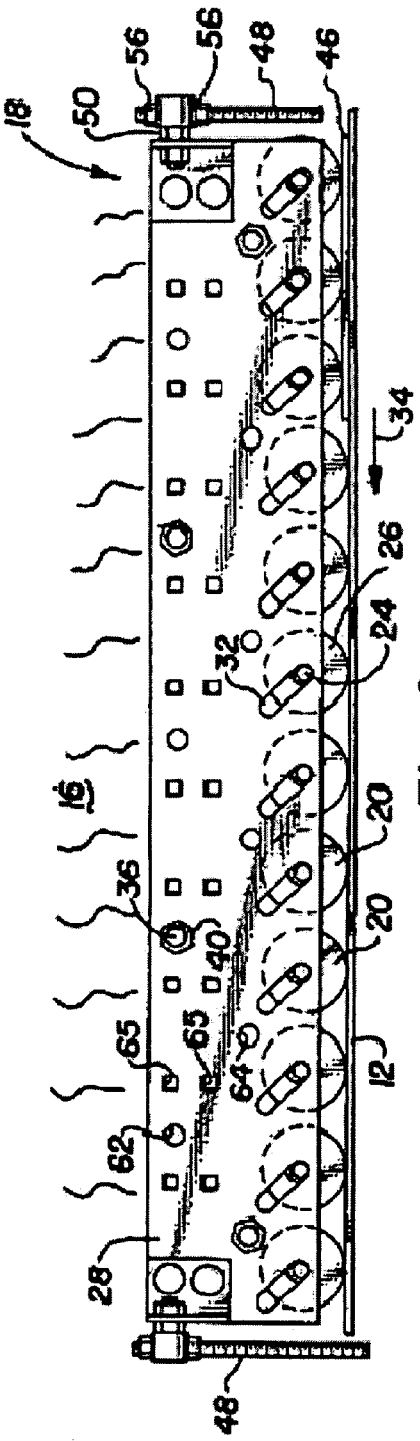
Fig. 1 (prior art)
Fig. 2 (prior art)

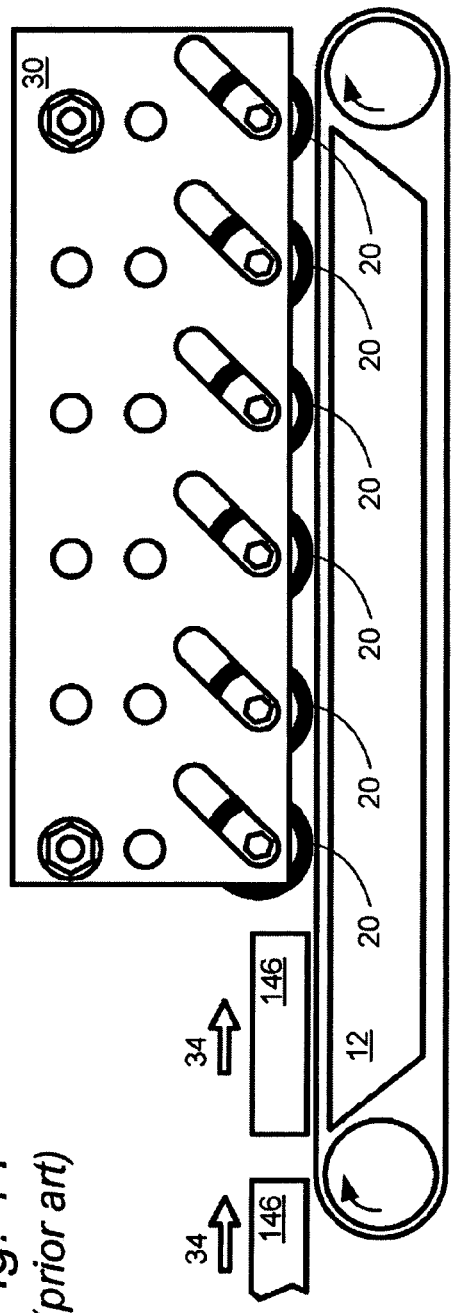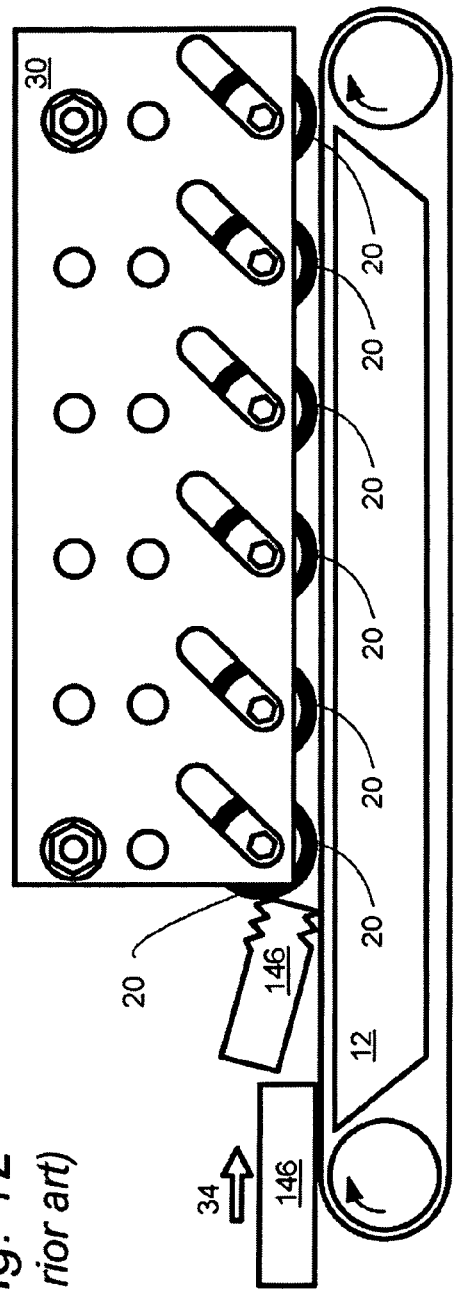
Fig. 11 (prior art)
Fig. 12 (prior art)

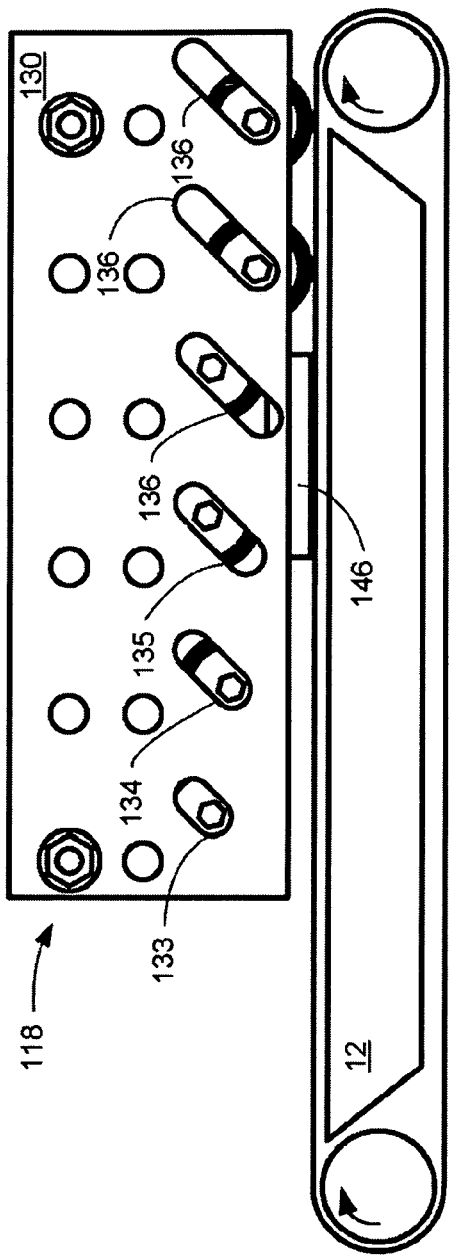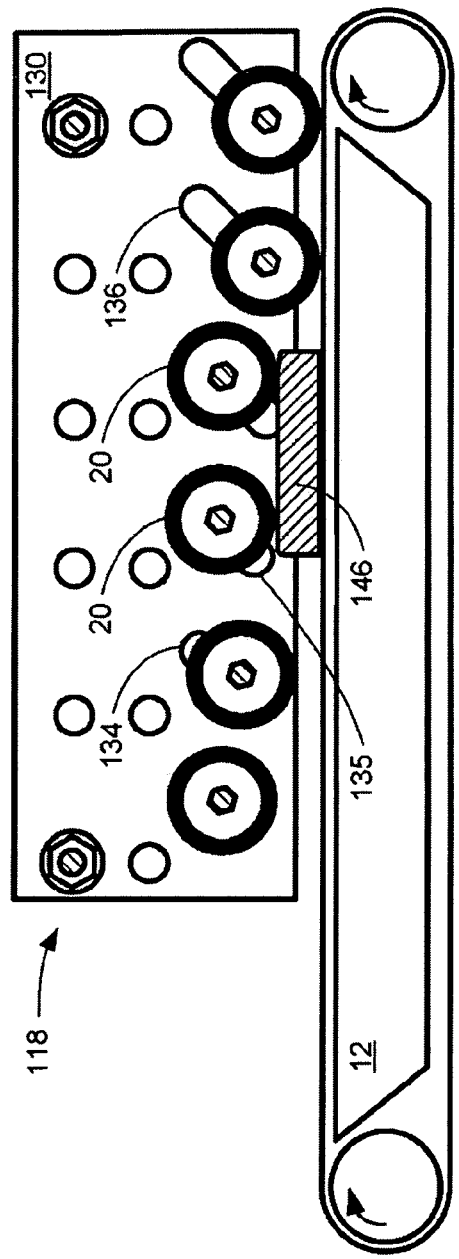
Fig. 17                    Fig. 18

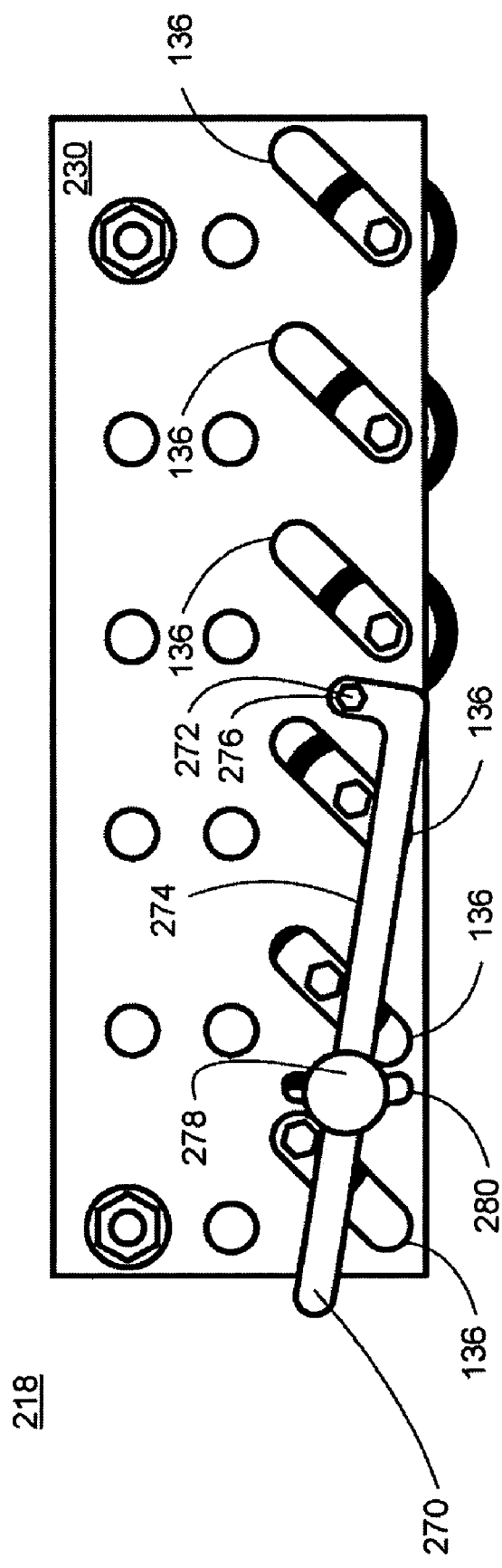

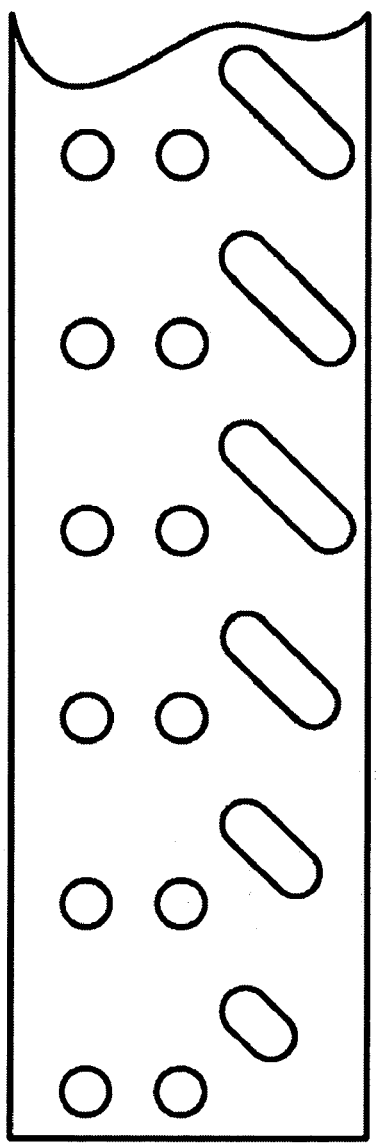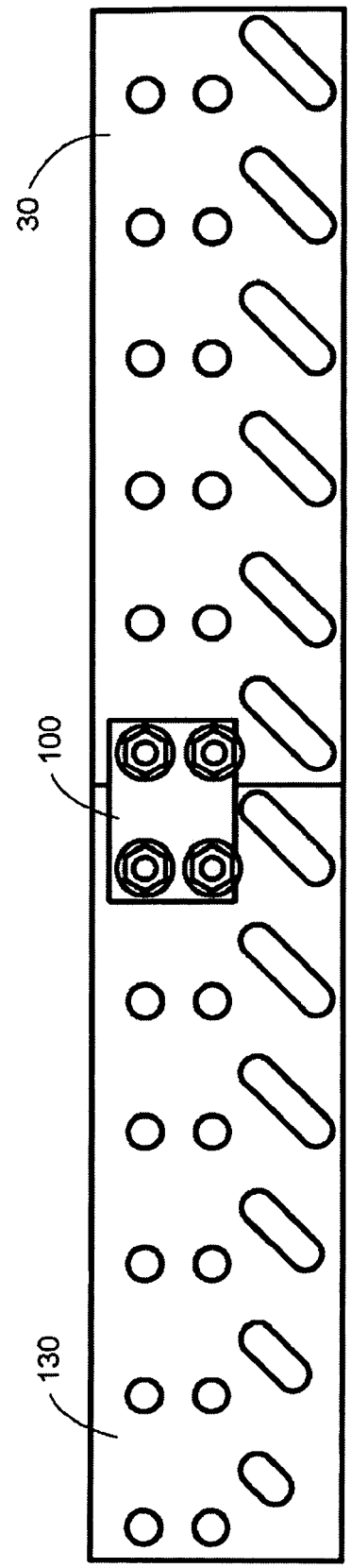
Fig. 23
Fig. 24

APPARATUS FOR ACCOMMODATING GREATER HEIGHT VARIANCE OF ARTICLES IN SHRINK PACKAGING MACHINE

COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

BACKGROUND OF THE INVENTION

The present invention relates generally to shrink packaging machines and, in particular, to shrink packaging machines for shrink wrapping thin or lightweight articles including, for example, easily deformed, bent, or folded articles that are thin or light weight, and that have a range of various heights.

In shrink wrapping articles, it is common to entirely cover each article top and bottom with a shrink film, such as polyvinyl chloride or polypropylene soft shrink material, and then transport the article covered in shrink film on a mesh or solid belt conveyor, or sometimes a roller conveyor, through a shrink tunnel including a hot air chamber. Typically, hot air is heated to between 150° Fahrenheit and 600° Fahrenheit and blown in the hot air chamber onto the shrink film while it is conveyed through the shrink tunnel. The hot air shrinks the shrink film about the article.

If the article happens to be thin, then pressure exerted on the article by the shrinking film tends to cause deformation or bending of the article. Additionally, if the article happens to be lightweight, then turbulent air blown within the hot air chamber tends to cause the article to float or otherwise lift off of the conveyor and move around within the chamber, which is undesirable.

A number of approaches to solving the problem of shrink wrapping thin or lightweight articles have been utilized. One older approach utilizes both bottom and top mesh or solid belt conveyers synchronized to travel in the same direction through the tunnel at the same speed. The top conveyer is spaced over the bottom conveyer at a distance which allows the particular article to fit between and contact the two conveyers. The use of two synchronized conveyers is fairly expensive and requires resetting of the distance between the two conveyers whenever an article having a new thickness is to be shrink wrapped. Furthermore, such an approach can not be readily deployed in existing shrink packaging machines that are not built to accommodate this approach.

In another approach to solving the problem of shrink wrapping thin or lightweight articles, efforts have been made to develop a low energy shrink film which can be used at lower temperatures and with less air circulation. Although such an approach may have merit, more traditional mechanical approaches may be preferable.

Another approach developed some years ago is disclosed in U.S. Pat. No. 5,009,057 to Wilkinson ("the '057 Patent"), the entirety of which is hereby incorporated herein by reference. This approach is illustrated and described herein with respect to FIGS. 1-12, and the present invention is considered to represent an improvement to shrink packaging machines and methods that utilize the approach of the '057 Patent.

In accordance with the '057 Patent, a shrink packaging machine 10 represented in FIGS. 1-5 includes a conveyer 12 for transporting an article 46 wrapped in shrink film through a shrink tunnel 14 and a hot air chamber 16 in which hot air is blown onto the shrink film within the shrink tunnel 14. The shrink packaging machine 10 also includes an apparatus 18 that prevents the article from becoming deformed and prevents the article from lifting off of the conveyer 12 during the shrink wrapping process.

The apparatus 18 includes a plurality of spaced apart rollers 20 and a support 22 for disposition of the plurality of rollers 20 above the conveyer 12. The plurality of rollers 20 are maintained by the support 22 in a disposition above and out of contact with the conveyer 12. Alternatively, the rollers 20 may be maintained by the support 22 in a disposition in which the rollers 20 rest upon the conveyer 12 as shown in order to accommodate an extremely thin article 46.

Each of the plurality of rollers 20 includes a central horizontal shaft 24 and a cylinder 26 rotatably mounted on the shaft 24. Each cylinder 26 is covered with a high temperature-resistant non-stick coating, such as silicon rubber or Teflon®. Support 22 includes a pair of side rails 28,30 spaced apart and forming slots 32 for receiving opposite ends of the shafts 24. The slots 32 of the left side rail 28 are directly opposite and identical in shape to corresponding slots 32 of the right side rail 30 so that the axis of each of the plurality of rollers 20 extends in a direction generally orthogonal to the direction of motion 34 of the conveyer 12.

The support 22 also includes threaded studs 36 passing through both side rails 28,30 for securing the side rails 28,30 in a fixed, spaced apart relationship. Each threaded stud 36 is secured to the side rails 28,30 by inner nuts 38 and outer nuts 40.

As shown in FIG. 5, each slot 32 extends in a direction that includes both a vertical component 42 and a horizontal component 44 relative to the direction of the conveyor motion 34. The vertical component 42 allows the vertical displacement of a corresponding one of the plurality of rollers 20 by an article 46 as the article is conveyed past the roller 20. The horizontal component 44 allows a corresponding roller 20 to be pushed slightly backwards in the direction of motion 34 of the conveyer 12, thereby making it easier for the article 46 to lift the roller 20.

As shown in FIG. 3, the support 22 also includes threaded legs 48 mounted to pivot about axes 50 in respective directions 52,54 that are transverse to the direction of motion 34 of the conveyer 12. The legs 48 thus can be pivoted outwardly from the side rails 28,30 and adjusted in length through adjusting nuts 56 to properly brace against side ledges 58 and upwardly extending lips 60 of the shrink packaging machine 10. The threaded legs 48 are of the same diameter and thread pitch as the threaded studs 36 so that all may be cut from the same stock. By simply cutting the threaded studs 36 to the proper length, the apparatus 18 can be easily made to work with any width conveyer or article 46.

Each side rail 28,30 may form regularly spaced upper holes 62 and regularly spaced lower holes 64 positioned just above the slots 32 for receiving the threaded studs 36. The side rails 28,30 also form regularly spaced pairs of apertures 65 for receiving mounts 66 for the mounting of threaded legs 48. The rails 28,30 can thus be cut to any length without special manufacture, and both rails can be cut from the same stock, simply reversing the direction which a particular rail faces to make it either a right side rail 30 or a left side rail 28.

A thin flat article 46 is shrink wrapped by covering the article 46 with shrink film and then conveying the article 46 on conveyer 12 through the shrink tunnel 14. At least one of the plurality of rollers 20 forcibly holds down the article 46 forcing it into constant engagement with the conveyor 12 as hot air is blown on article 46 in the hot air chamber 16. The plurality of spaced apart rollers 20 permits the hot air to be blown in-between the rollers 20 and around the article 46.

In the shrink packaging machine 10 as shown in FIGS. 1-5, the cylinders 26 of the rollers 20 actually contact the surface of the conveyer 12 which, in turn, imparts to each cylinder 26 rotational motion around its respective shaft 24 further facilitating the movement of the article 46 covered in shrink film through the shrink tunnel 14. In this respect, the rollers 20 each at least contacts the particular article 46 during its passage through the shrink tunnel 14 even if each roller 20 does not actually touch the conveyer 12, although it also is possible for the rollers 20 to be disposed just slightly above the article 46 in order to simply prevent the article 46 from curling or deforming more than a limited amount.

A second apparatus 18 representative of the approach of the '057 Patent is illustrated in FIGS. 6-12, wherein similar structures are referenced by the same callout numbers. The illustrations of the second apparatus 18 have been simplified in order to render more apparent the differences between the prior art of the '057 Patent and various embodiments of the present invention.

In this respect, a right side elevational view of the second apparatus is illustrated in FIG. 6, and a front elevational view of the second apparatus 18 is illustrated in FIG. 7. A right side elevational view of the second apparatus 18 is illustrated in FIG. 8 and is shown in operation with a conveyor 12 of a shrink packaging machine 10 wherein a thin article 46 is about to be shrink wrapped. Because of the low profile (height) of the article 46 relative to the diameter of the rollers 20, the article 46 moves smoothly underneath the rollers 20 by displacing them vertically and horizontally. Articles 86 relatively thicker than article 46 also may be guided smoothly underneath the rollers 20 if the thicker articles 86 have appropriate contours that enable each roller 20 to be displaced vertically and horizontally, as shown in FIGS. 9-10. For example, the articles 86 of FIGS. 9-10 each includes a generally wedge-shaped profile on its leading edge that provides an incline for ascension of the rollers 20.

In contrast, the second apparatus 18 of the shrink packaging machine may not properly work with a series of thick, non-contoured articles 146 to be shrink wrapped as illustrated, for example, in FIGS. 11-12. In this scenario, the thicker size of the lead article 146 tends to contact the first roller 20 at an angle nearly perpendicular to the surface of the roller 20 and, instead of being guided smoothly underneath the roller 20, the article 146 is blocked and even damaged by the roller 20, as illustrated in FIG. 12.

In this situation, even though the second apparatus 18 may have sufficient vertical roller movement to accommodate the thickness of the article 146, the thickness of the article 146 relative to the diameter of the roller 20 and the distance between the roller 20 and the conveyor 12 act to prevent such vertical displacement from occurring. This further leads to lifting of the rearward portion of the article 146 off of the conveyor 12, especially when the first roller is disposed in contact with the conveyor 12 and, as a result, is undergoing rotational movement that tends to force downward the front portion of the article 146.

As will be appreciated by the Ordinary Artisan, the scenario illustrated in FIG. 12 may result in damage to the article 146, misalignment of one or more of the articles 146 passing into the second apparatus 18, and/or jamming of the apparatus 18, all of which then may require undesired manual intervention, moreover, it will be appreciated that, while the second apparatus 18 illustrated in FIGS. 11-12 could be raised to properly work with the thicker articles 146, such modification and setup of the shrink packaging machine 10 also requires manual intervention.

Accordingly, a need exists for an apparatus that may be used, for example, in place of the second apparatus of FIGS. 6-12 and that accommodates both the articles 46 and articles 146 shown therein. One or more embodiments of the present invention comprise such an apparatus.

SUMMARY OF THE INVENTION

In a first aspect of the invention, a shrink packaging machine for shrink wrapping an article with shrink film includes: a hot air chamber; a conveyor operable to transport the article covered by shrink film at least partially through the hot air chamber; a first roller disposed over the conveyor and configured to engage the article transported on the conveyor; and a plurality of additional rollers disposed over the conveyor. Each of the plurality of additional rollers is vertically displaceable relative to the conveyor independent of displacement of the other of the plurality of additional rollers. Furthermore, when each of the plurality of additional rollers is in a respective lowermost position relative to the conveyor, an axis of rotation of the first roller is disposed at a height from the conveyor that is greater than a respective height from the conveyor at which each axis of rotation of each of the plurality of additional rollers is disposed.

In a feature of this aspect, the first roller is vertically displaceable relative to the conveyor independent of displacement of the plurality of additional rollers. The first roller may be vertically displaceable within a slot and the extent of vertical displacement may be limited by a blocking member or an insert that is removable disposed within the slot. The first roller also may be horizontally displaceable relative to the conveyor. Alternatively, the first roller may be disposed in fixed vertical disposition over the conveyor.

In another feature of this aspect, one of the plurality of additional rollers is configured to engage the article transported on the conveyor during engagement of the article by the first roller.

In another feature of this aspect, each of the first roller and the plurality of additional rollers has the same diameter. Alternatively, the first roller may have a diameter different from a respective diameter of each of the plurality of additional rollers. In this respect, the diameter of the first roller may be greater than the respective diameter of each of the plurality of additional rollers and, moreover, the first roller may be driven by contact with the conveyor and each of the plurality of additional rollers may be driven by contact with the conveyor when each of the plurality of additional rollers is in its respective lowermost position relative to the conveyor.

In yet another feature, the machine further includes a second roller disposed over the conveyor that is configured to engage the article transported on the conveyor during engagement of the article by the first roller. Moreover, when each of the plurality of additional rollers is in its respective lowermost position relative to the conveyor, an axis of rotation of the second roller is disposed at a height from the conveyor that is greater than a respective height from the conveyor at which each axis of each of the plurality of additional rollers is disposed. The axis of the first roller, in turn, is disposed at a height from the conveyor that is greater than the height from the conveyor at which the axis of the second roller is disposed.

With additional regard to this feature, the second roller may be vertically displaceable relative to the conveyor independent of displacement of the other of the plurality of additional rollers. The second roller further may be horizontally displaceable relative to the conveyor. The first roller also may be vertically displaceable relative to the conveyor independent of displacement of the plurality of additional rollers with the second roller being vertically displaceable to an extent greater than that of the first roller. The vertical displacement of the first roller and the vertical displacement of the second roller both also may be limited by a blocking member, such as a pivot arm or a slot insert. Alternatively, the first roller and the second roller both may be disposed in fixed vertical disposition over the conveyor.

In another aspect of the invention, a method of shrink wrapping an article in a shrink packaging machine includes the steps of: transporting on a conveyor into a hot air chamber of the shrink packaging machine an article covered in shrink film; engaging the article being transported on the conveyor with a first roller such that the first roller rolls over the article and applies a downward force onto the article as the article passes there under; as the first roller rolls over the article and applies a downward force onto the article, engaging the article being transported on the conveyor with a second roller such that the second roller rolls over the article and applies a downward force onto the article as the article passes there under. The step of engaging the article with the first roller further comprises engaging the article with the first roller at a first initial vertical height from the conveyor that is less than the initial vertical height of an axis of rotation of the first roller from the conveyor, and the step of engaging the article with the second roller further comprises engaging the article with the second roller at a second initial vertical height from the conveyor that is less than the initial vertical height of an axis of rotation of the second roller from the conveyor, the initial vertical height of the axis of rotation of the second roller from the conveyor being less than the initial vertical height of the axis of rotation of the first roller from the conveyor.

In a feature of this aspect, the method comprises the further step of engaging the article being transported on the conveyor with a third roller such that the third roller rolls over the article and applies a downward force onto the article as the article passes there under, the further step being performed as the second roller rolls over the article and applies a downward force onto the article. The step of engaging the article with the third roller further may comprise engaging the article with the third roller at a third initial vertical height from the conveyor that is less than the initial vertical height of the axis of rotation of the third roller, the initial vertical height of the axis of rotation of the third roller being less than the initial vertical height of the axis of rotation of the second roller.

In another feature, the step of engaging the article with the first roller further comprises engaging the article with the first roller such that the first roller is vertically displaced in a direction generally orthogonal to the direction of transport of the article on the conveyor. The step of engaging the article with the first roller further may comprise engaging the article with the first roller such that the first roller also is horizontally displaced in a direction generally parallel to the direction of transport of the article on the conveyor.

In another feature of the method, the step of engaging the article with the first roller further comprises engaging the article with the first roller such that the first roller is neither vertically displaced in a direction generally orthogonal to the direction of transport of the article on the conveyor nor horizontally displaced in a direction generally parallel to the direction of transport of the article on the conveyor.

In another feature, the method further comprises the step of adjusting the initial vertical height of the axis of rotation of the first roller by moving a member that defines a lower margin of a slot against which the first roller is supported. The initial vertical height of the axis of rotation of the second roller also may be adjusted by moving a member that defines a lower margin of a slot against which the second roller is supported.

In another feature, the method further comprises the step of adjusting the initial vertical height of the axis of rotation of the first roller by installing an insert into a slot in which the first roller is retained such that the insert defines a lower margin of the slot which the first roller abuts. The initial vertical height of the axis of rotation of the second roller also may be adjusted by installing an insert into a slot in which the second roller is retained such that the insert defines a lower margin of the slot which the second roller abuts.

In still another feature, the method further comprises the step of adjusting the initial vertical height of the axis of rotation of the first roller by installing the first roller in a pair of opposed apertures among a plurality of opposed aperture pairs, each of the pair of opposed apertures having a different vertical height from the conveyor. The initial vertical height of the axis of rotation of the second roller also may be adjusted by installing the second roller in a pair of opposed apertures among a plurality of opposed aperture pairs, each of the pair of opposed apertures having a different vertical height from the conveyor.

In a feature of this aspect of the invention, the first roller may be driven by the conveyor by positioning the first roller in contact with the conveyor. The second roller also may be driven by the conveyor by positioning the first roller in contact with the conveyor.

In another feature, the method further comprises the steps of successively engaging the article being transported on the conveyor with each of a plurality of additional rollers such that each of the plurality of additional rollers applies a downward force onto the article as the article passes there under. In this feature, the steps of successively engaging the article with each of a plurality of additional rollers further may comprise successively engaging the article with each of a plurality of additional rollers at the same initial vertical height that is less than the respective vertical height of the axis of rotation of each additional roller, and further may comprises engaging the article with each of the plurality of additional rollers such that each additional roller is both vertically displaced in a direction generally orthogonal to the direction of transport of the article on the conveyor and horizontally displaced in a direction generally parallel to the direction of transport of the article on the conveyor.

In yet a third aspect of the invention, an apparatus for use in a shrink packaging machine includes: a plurality of rollers, each roller including a shaft and a cylindrical member mounted on the shaft for rotation about an axis of the shaft; and a frame including a pair of parallel side members generally extending in a first, horizontal direction and defining a plurality of slots receiving opposite ends of the shafts of the rollers for mounting of the rollers between the side members. Each of the slots has a slot length that extends in a direction having both a component extending in the first, horizontal direction and a component extending in the second, vertical direction orthogonal to the first, horizontal direction. In this respect, the rollers mounted between the side members each generally extends in a third direction orthogonal both to the first, horizontal direction and to the second, vertical direction, with each of the rollers being received within a pair of the slots and being vertically and horizontally displaceable within the pair of slots. In accordance with this aspect of the invention, the axes of the rollers do not lie within a horizontal plane when each roller is disposed at a lowermost position within its respective pair of slots.

In a feature of this aspect, the slot length of each a first subset of the plurality of slots is less than a slot length of each of a second subset of the plurality of slots. Each subset of slots may include only a single slot or a plurality of slots.

In yet another feature, the slot length of each a first subset of the plurality of slots is less than a slot length of each of a second subset of the plurality of slots; the slot length of each of the second subset of the plurality of slots is less than a slot length of each of a third subset of the plurality of slots; the side members have opposed ends in the first, horizontal direction; and the first subset of slots is disposed closer to a first the opposed end of the side members than the second subset of slots, and the second subset of slots is disposed closer to the first opposed end of the side members than the third subset of slots.

In another feature, the lowermost position of one of the rollers is selectively adjustable. In this respect, the lowermost position of one of the rollers may be defined by a blocking member that is adjustably positionable. For example, the blocking member may comprise an arm that is pivotably mounted and that extends adjacent to one or more of the slots. Alternatively, the blocking member may comprise an insert that is adapted to be removably disposed within the slot and the inert may be chosen from one of a plurality of differently sized inserts. For example, the inserts may have different lengths for selectively limiting the range of movement of rollers within the slots.

In still yet another aspect, an apparatus for use in a shrink packaging machine includes: a first plurality of rollers, each roller including a shaft and a cylindrical member mounted on the shaft for rotation about an axis of the shaft; and a frame including a pair of parallel side members generally extending in a first, horizontal direction and defining a plurality of slots receiving opposite ends of the shafts of the rollers for mounting of the rollers between the side members. Each of the slots has a slot length that extends in a direction having both a component extending in the first, horizontal direction and a component extending in the second, vertical direction orthogonal to the first, horizontal direction, and the rollers mounted between the side members each generally extends in a third direction orthogonal both to the first, horizontal direction and to the second, vertical direction. Each of the rollers mounted between the side members also is received within a pair of the slots and is vertically and horizontally displaceable within the pair of the slots, the axes of the rollers generally lying within a horizontal plane when each roller is disposed at a lowermost position within its respective pair of slots.

The apparatus further includes a plurality of additional rollers, each additional roller including a shaft and a cylindrical member mounted on the shaft for rotation about an axis of the shaft, each additional roller being mounted between the side members in fixed disposition relative to the side members in both the first, horizontal direction and the second, vertical direction, the additional rollers. In accordance with this aspect, the axes of the additional rollers do not lie within a horizontal plane and none are generally coplanar with the axes of the first plurality of displaceable rollers when each of the displaceable rollers is disposed at the lowermost position within its respective pair of slots. The axes of the additional rollers themselves may or may not be coplanar.

BRIEF DESCRIPTION OF THE DRAWINGS

One or more embodiments of the present invention will now be described in detail with reference to the accompanying drawings, wherein the same elements are referred to with the same reference numerals, and wherein:

FIG. 1 is a right side elevational view of a prior art shrink packaging machine along with a shrink wrapped article.

FIG. 2 is a left side elevational view of a prior art apparatus positioned within a hot air chamber above a conveyer of a shrink packaging machine and an article covered with shrink film to be shrink wrapped.

FIGS. 11 and 12 are right side elevational views of the apparatus of FIG. 6, shown in operation with a conveyor of a shrink packaging machine and a thick, non-contoured article to be shrink wrapped.

FIG. 17 is a right side elevational view of the apparatus of FIG. 13, shown in operation with a conveyor of a shrink packaging machine, with an article to be shrink wrapped midway through the apparatus.

FIG. 18 is a right side cross-sectional view of the apparatus of FIG. 17.

FIG. 19 is a right side elevational view of a apparatus in accordance with a second preferred embodiment of the present invention.

FIG. 23 is a right side elevational view of a portion of an extended version of the side rail of FIG. 14.

FIG. 24 is a right side elevational view of the side rail of FIG. 14 connected to the side rail of FIG. 6.

DETAILED DESCRIPTION

Figure 3:
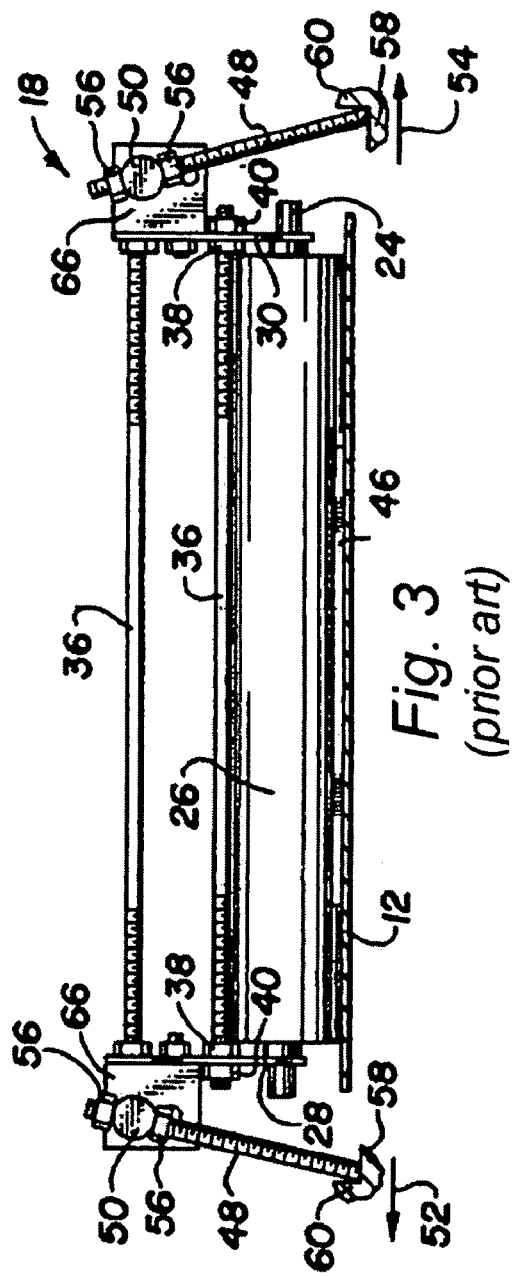
FIG. 3 is a front elevational view of the apparatus of FIG. 2 also showing side ledges and upwardly extending lips of the shrink packaging machine.
Figure 5:
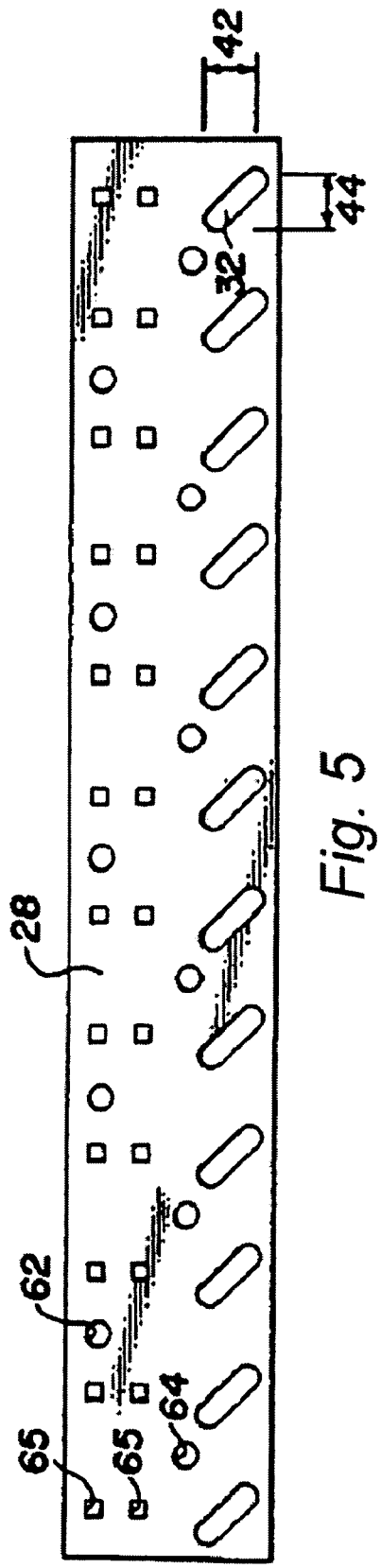
FIG. 5 is an elevational view of a side rail of the apparatus of FIG. 2.
Figure 4:
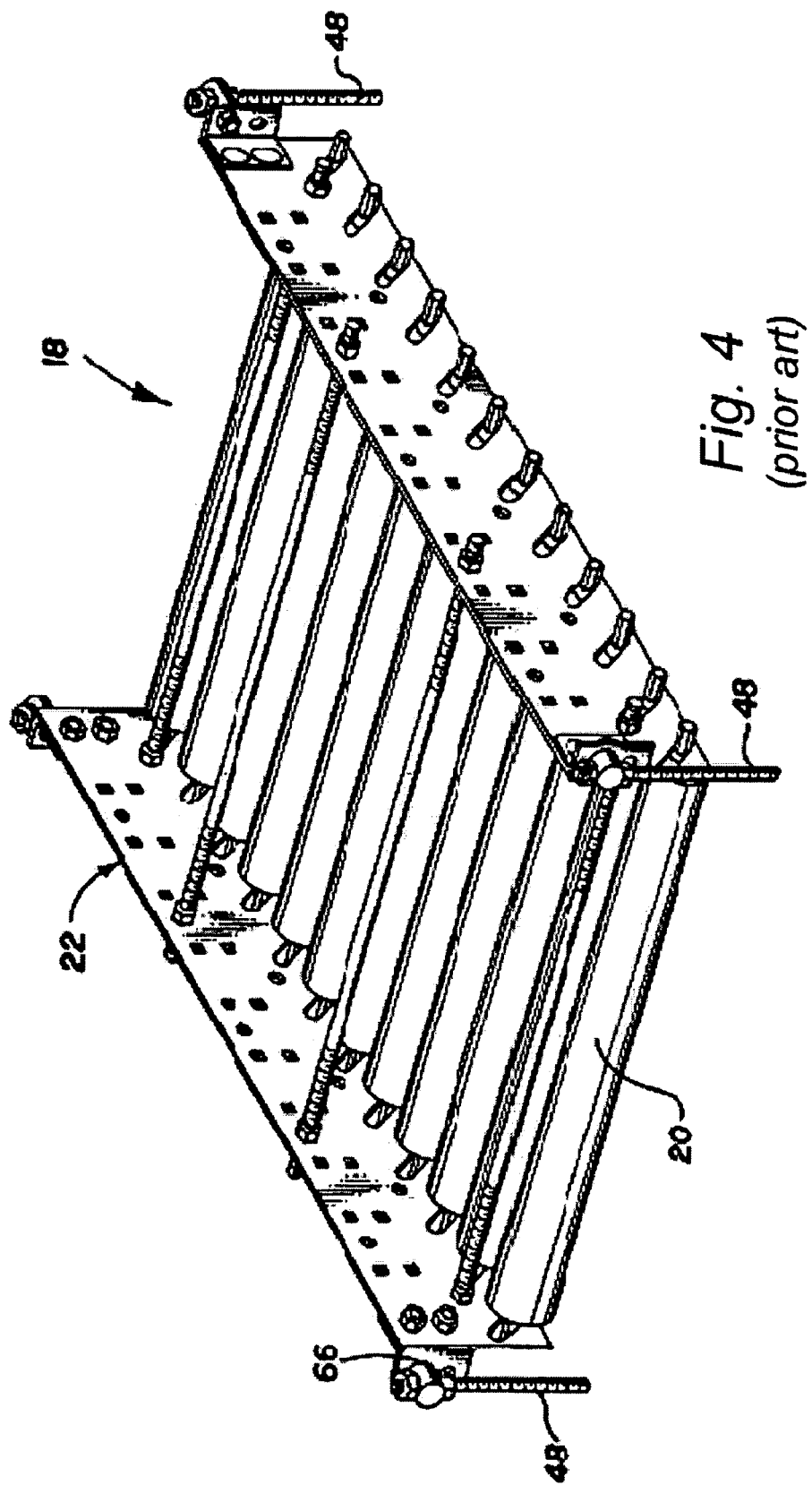
FIG. 4 is a left rear perspective view of the apparatus of FIG. 2.
Figure 6:
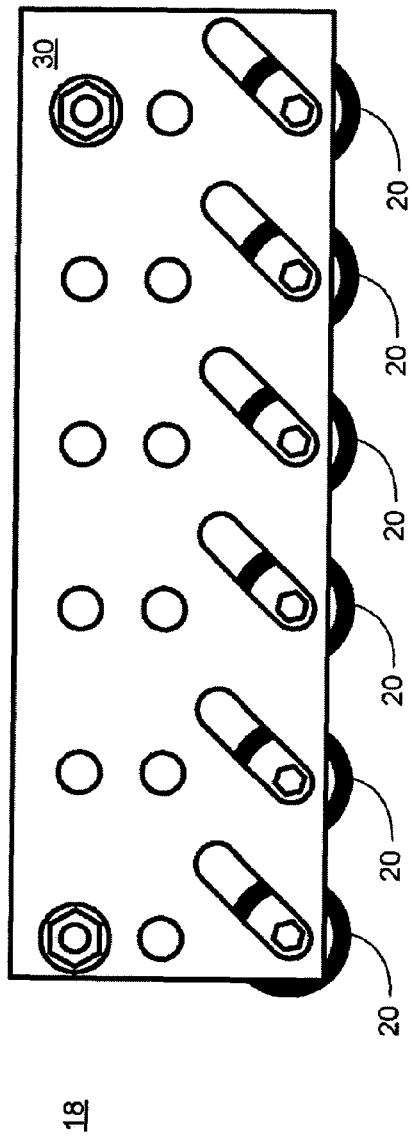
FIG. 6 is a right side elevational view of a prior art apparatus similar to that of FIGS. 1-5.
Figure 7:
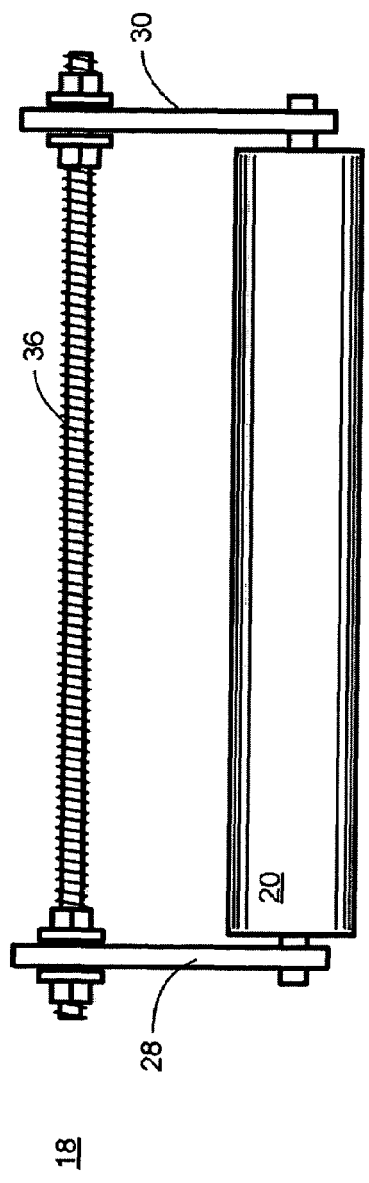
FIG. 7 is a front elevational view of the apparatus of FIG. 6.
Figure 8:
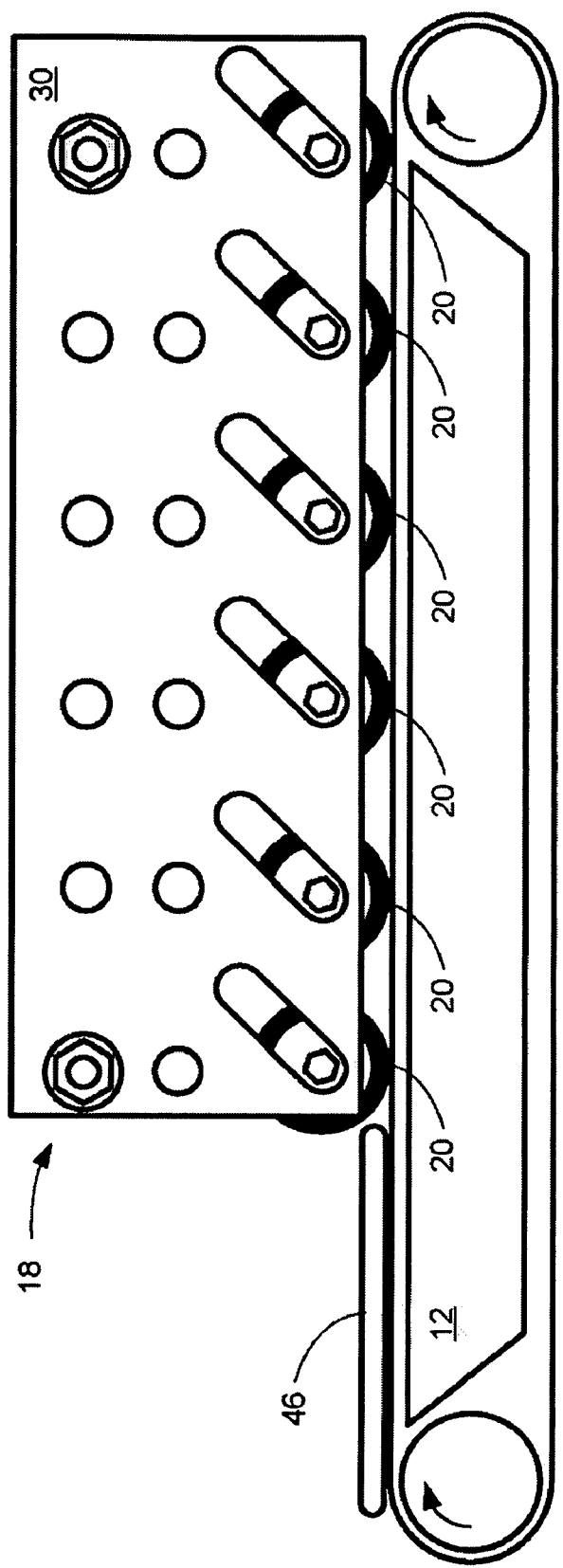
FIG. 8 is a right side elevational view of the apparatus of FIG. 6, shown in operation with a conveyor of a shrink packaging machine and a thin article to be shrink wrapped.
Figure 9:
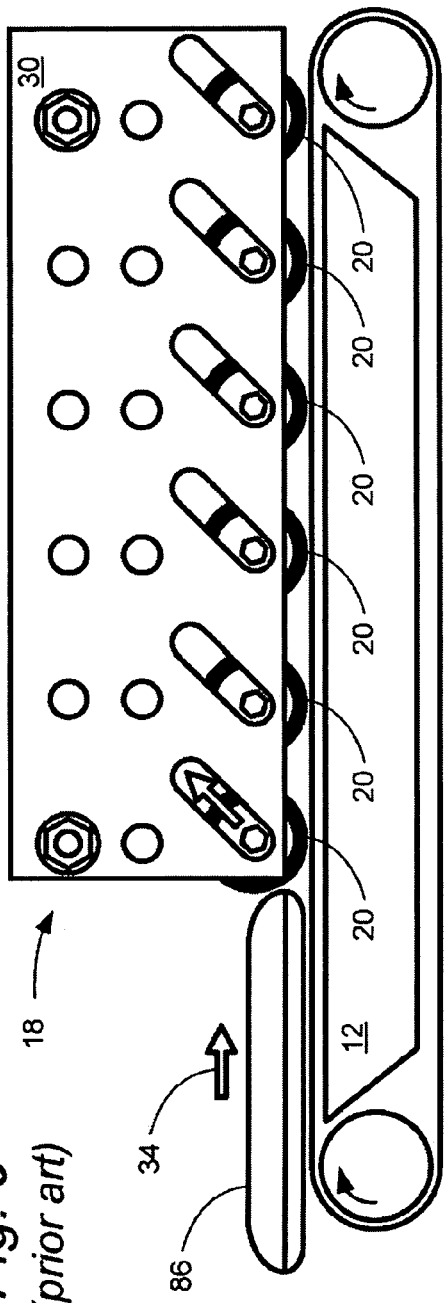
FIGS. 9 and 10 are right side elevational views of the apparatus of FIG. 6, shown in operation with a conveyor of a shrink packaging machine and a thick, contoured article to be shrink wrapped.
Figure 10:
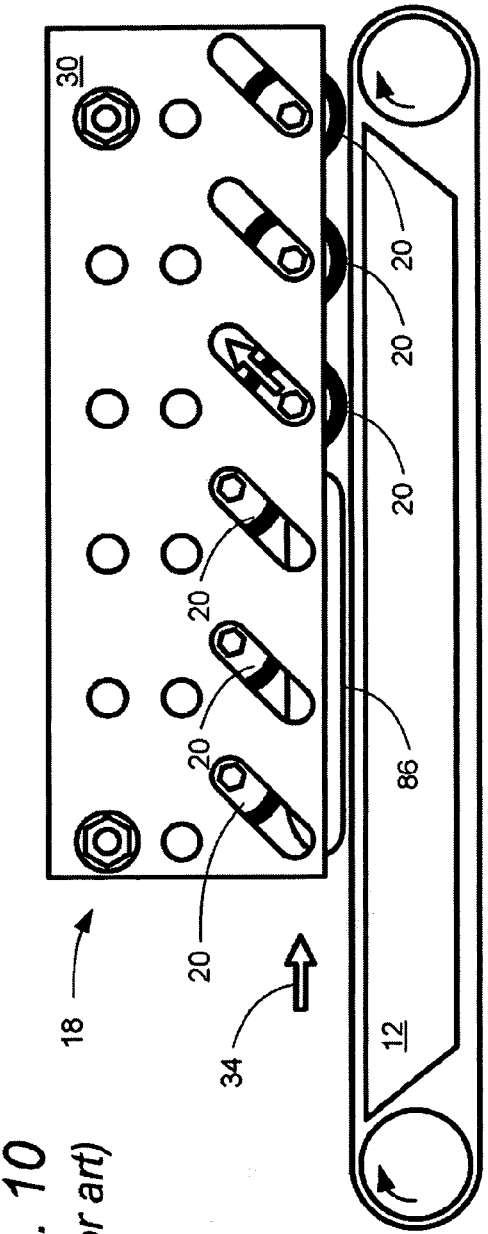

As a preliminary matter, it will readily be understood by one having ordinary skill in the relevant art ("Ordinary Artisan") that the present invention has broad utility and application. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at lease one of the items," but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Figure 13:
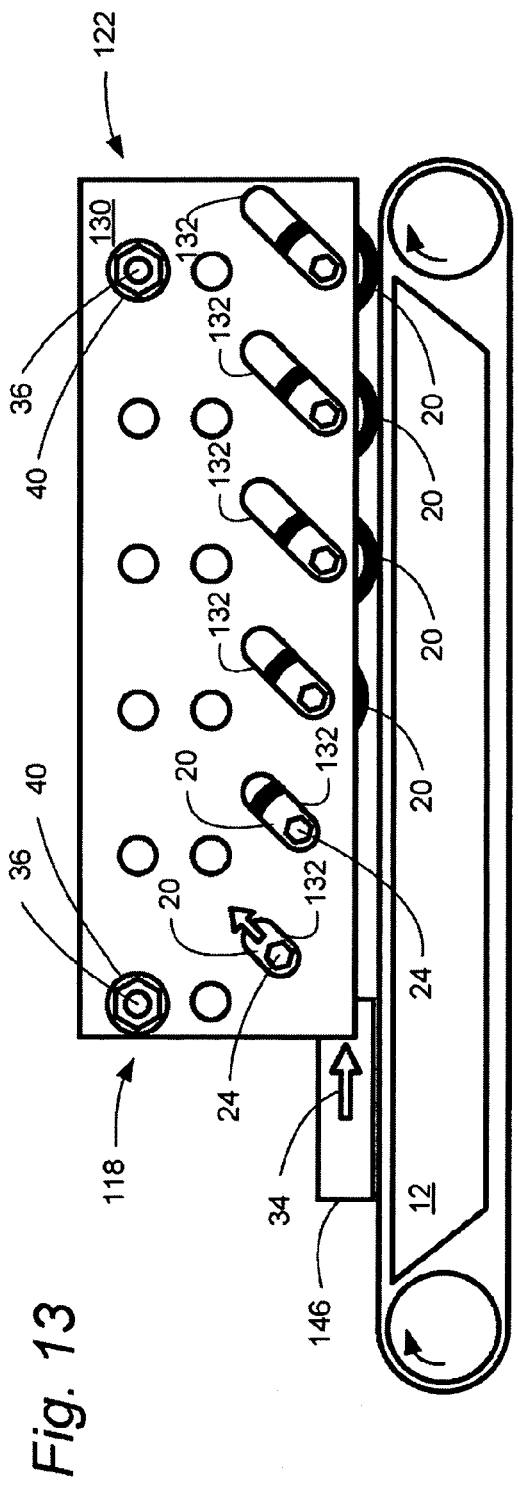
FIG. 13 is a right side elevational view of an apparatus in accordance with a first preferred embodiment of the present invention.
Figure 15:
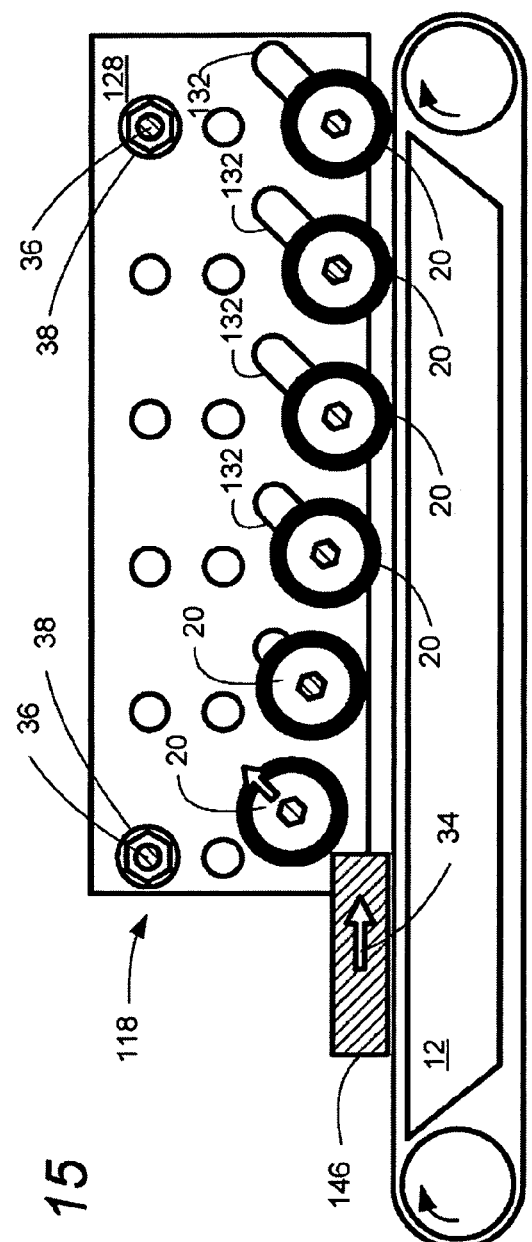
FIG. 15 is a right side cross-sectional view of the apparatus of FIG. 13, taken along line 15-15 of FIG. 14.
Figure 14:
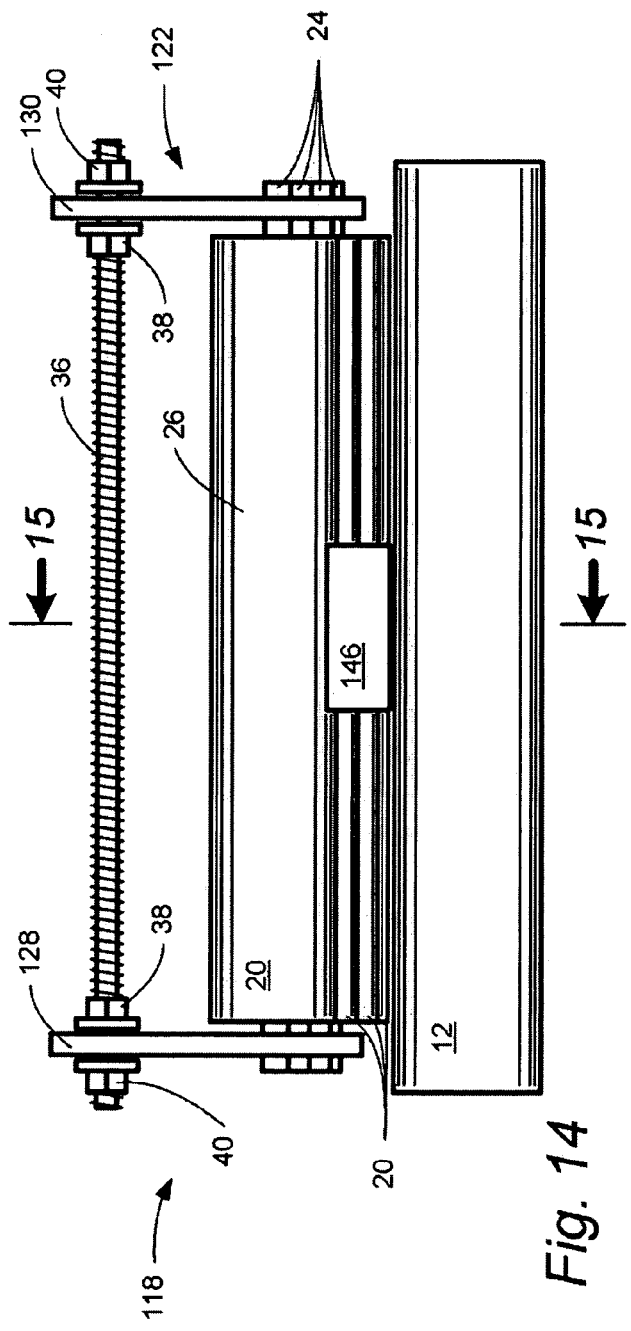
FIG. 14 is a front view of the apparatus of FIG. 13.

Turning now to the drawings, a right side elevational view and a right side cross-sectional view of a first embodiment 118 of an apparatus in accordance with the present invention are illustrated, respectively, in FIGS. 13 and 15. A front elevational view of the apparatus 118 is illustrated in FIG. 14. The apparatus 118 is shown in FIGS. 13-15 in conjunction with a conveyor 12 of a shrink packaging machine 10, wherein an article 146 to be shrink wrapped is just coming into contact with the apparatus 118.

The apparatus 118 includes a plurality of spaced apart rollers 20 and a support 122 for disposition of the plurality of rollers 20 above the conveyor 12. The rollers 20 and their disposition above the conveyor 12 are similar to those described previously with regard to FIGS. 1-12, and each roller 20 includes a central horizontal shaft 24 and a cylinder 26 that is rotatably mounted on the shaft 24. The cylinder 26 of each roller 20 preferably is covered with a high temperature-resistant non-stick coating, such as silicon rubber or Teflon®. The covering may constitute an application of the material to the roller, thereby forming a coating, or, alternatively, the covering may constitute a piece of the material that is adhered, or otherwise attached to, the rollers 20.

Figure 16:
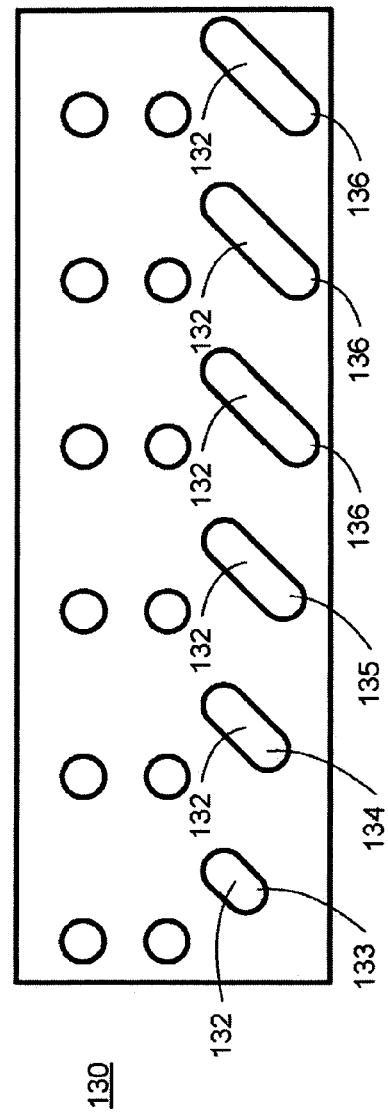
FIG. 16 is a right side elevational view of one of the side rails of the apparatus of FIG. 13.

The support 122 includes a pair of spaced apart side members comprising side rails 128,130 which define slots 132 for receiving opposite ends of the shaft 24 of each roller 20. FIG. 16 is a right side elevational view of one of the side rails 130 of the apparatus of FIG. 15. The slots 132 of the left side rail 128 are preferably directly opposite and identical in shape to corresponding slots 132 of the right side rail 130 so that each of the plurality of rollers 20 is oriented with its axis disposed generally orthogonal to the direction of motion 34 of the conveyor 12. The support 122 also preferably includes at least one threaded stud 36 passing through both side rails 128,130 for securing the side rails 128,130 in their spaced apart relationship. In the embodiment shown, each threaded stud 36 is secured to the side rails 128,130 by inner nuts 38 and outer nuts 40.

Each slot 132 preferably extends in a direction having both a vertical component 42 and a horizontal component 44. The vertical component 42 allows vertical displacement of a corresponding one of the plurality of rollers 20 by an article 146 as the article 146 is conveyed past the roller 20. The horizontal component 44 of each slot 132 allows horizontal displacement of a corresponding roller 20 whereby the corresponding roller 20 is pushed slightly backwards in the direction 34 of motion of the conveyor 12, making it easier for the article 146 to lift the roller 20.

Each side rail 128,130 may form regularly spaced pairs of apertures positioned just above the slots 132 for receiving the threaded studs 36 and/or for receiving mounts for mounting threaded legs (not shown). The rails 128,130 thus can be cut to any length without special manufacture, and both rails 128,130 can be cut from the same stock, simply reversing the direction which a particular rail faces to make it either a right side rail 130 or a left side rail 128. The threaded legs may be generally similar to the threaded legs 48 of FIG. 3 and have similar functionality and design.

Referring now to FIG. 16, a significant distinction is evident between the slots 132 in the side rails 128,130 of the apparatus 118 and the slots 32 shown and described previously with respect to the apparatus 18 of FIGS. 1-12. Specifically, as shown in FIG. 16, variations in slot length exist between a first subset of slots 133, a second subset of slots 134, a third subset of slots 135, and a fourth subset of slots 136 of the apparatus 118, wherein the apparatus 18 of FIGS. 1-12 include slots 32 having substantially uniform length, wherein each subset includes one or more slots. In this regard, each of the fourth subset of slots 136 are preferably of the same general size and design as the slots 32 shown, for example, in FIG. 5. The first, second and third subsets of slots 133,134,135, however, are of progressively greater lengths, all of which are less than the slot length of the fourth subset of slots 136.

Additionally, the lower end of each of the first subset of slots 133 preferably is positioned at a distance from the bottom of the rail 130 that is slightly greater than the distance from the bottom of the rail 130 of each lower end of the second subset of slots 134. Similarly, the lower end of each of the second subset of slots 134 is positioned at a distance from the bottom of the rail 130 that is slightly greater than the distance from the bottom of the rail 130 of each lower end of the third subset of slots 135, and the lower end of each of the third subset of slots 135 is positioned at a distance from the bottom of the rail 130 that is slightly greater than the distance from the bottom of the rail 130 of each lower end of the fourth subset of slots 136. When rollers having similar diameters (such as illustrated rollers 20) are mounted in these slots, this arrangement creates a graduated or tapered opening into the upstream end of the shrink tunnel of the shrink packaging machine in which the apparatus 118 is included.

This graduated or tapered opening provided by the relative positions of the rollers 20 retained by the first, second, and third subsets of slots 133,134,135 provides a significant advancement over the prior arrangements of rollers 20, such as that shown in FIGS. 1-12. In particular, relatively thicker articles, such as articles 146 of FIGS. 11-12, are accommodated by the apparatus 118 of the present invention in contrast to the apparatus 18 of the prior art illustrated in FIGS. 1-12.

In operation, the article 146 first comes into contact with the lower front portion of a roller 20 retained in a slot 133. Because the article 146 engages the lower portion of the first roller 20, i.e., because the article 146 does not initially engage the first roller in a direction that is substantially perpendicular to the surface of the roller at the point of engagement, the first roller 20 is readily displaced for passage of the article 146 under the first roller 20.

Once the article 146 passes beneath the first roller 20, the article 146 comes into contact with the lower front portion of the next subsequent roller 20 retained in a slot 134. Because the first roller 20 rides on top of the article 146 when the article 146 comes into contact with the second roller 20, the first roller 20 tends to exert pressure upon the article 146 and serves to counteract any tendency of the back portion of the article 146 to lift up from the conveyor 12 upon contact with the second roller 20. Consequently, the second roller is more readily displaced by the article 146.

The article 146 furthermore preferably engages the second roller in a direction that is not substantially perpendicular to the surface of the roller at the point of engagement, whereby the second roller is more readily displaced for passage of the article 146 there under. However, it will be appreciated that, because of the force exerted by the first roller on the article 146, the article 146 may engage the second roller in a direction that is closer to being orthogonal to the surface of the roller at the point of engagement than the direction of contact at the point of engagement between the article 146 and the first roller.

The article 146 then comes into contact with the lower front portion of the next subsequent roller 20 retained in a slot 135. Because one or more of the previous rollers continue to ride upon of the article 146 when the article 146 comes into contact with the next subsequent roller, pressure is exerted upon the article 146 that serves to counteract any tendency of the back portion of the article 146 to lift up from the conveyor 12 upon contact with the next subsequent roller. Consequently, the next subsequent roller is more readily displaced by the article 146.

The article 146 furthermore preferably engages the next subsequent roller in a direction that is not substantially perpendicular to the surface of the roller at the point of engagement, whereby the next subsequent roller is more readily displaced for passage of the article 146 there under. However, it will be appreciated that, because of the continued force exerted by one or more previous rollers on the article 146, the article 146 may engage the next subsequent roller in a direction that is closer to being orthogonal to the surface of the roller at the point of engagement than the direction of contact at the point of engagement between the article 146 and a previous roller.

Finally, the article 146 comes into contact with the lower front portion of the next subsequent roller 20 retained in a slot 136. Because one or more of the previous rollers continue to ride upon of the article 146 when the article 146 comes into contact with the next subsequent roller, pressure is exerted upon the article 146 that serves to counteract any tendency of the back portion of the article 146 to lift up from the conveyor 12 upon contact with the next subsequent roller. Consequently, the next subsequent roller is more readily displaced by the article 146.

The article 146 furthermore preferably engages the next subsequent roller in a direction that is not substantially perpendicular to the surface of the roller at the point of engagement, whereby the next subsequent roller is more readily displaced for passage of the article 146 there under. However, it will be appreciated that, because of the continued force exerted by one or more previous rollers on the article 146, the article 146 may engage the next subsequent roller in a direction that is closer to being orthogonal to the surface of the roller at the point of engagement than the direction of contact at the point of engagement between the article 146 and a previous roller. In fact, the point of engagement may be such that the roller would not be displaced by the article 146 but for the continued force being exerted upon the article 146 by one or more of the previous rollers.

It will also be noted that the tapered opening provided by the apparatus 118 especially works well if the article 146 itself is compressible. In this regard, while the article 146 displaces the first roller 20, the article 146 further may be compressed by the first roller 146, thereby lowering the vertical height of its point of impact with the second roller. The degree of compression further may be increased by increasing the weight of the first roller, or by fixing the vertical disposition of the first roller as in other embodiment of the invention described below. Compression of the article 146 also tends to facilitate passage of the article 146 under subsequent rollers.

Some overall benefits are shown, for example, in FIGS. 17-18, which illustrate a right side elevational view and a right side cross-sectional view, respectively, of the apparatus 118. As shown in FIGS. 17-18, a thick article 146 to be shrink wrapped has been transported midway through the apparatus 118 on the conveyor 12. As the article 146 has passed the various rollers 20 forming the tapered opening of the shrink packaging machine, the rollers 20 are successively displaced while their weight causes the article 146 to be compressed. In this way, article 146, which would have been too thick to be reliably guided under the first roller 20 of the prior art apparatus 18 illustrated in FIGS. 1-12 without manual intervention and adjustment, now may be shrink wrapped without such manual intervention using the apparatus 118 of the present invention.

Apart from the aforementioned, the structure and operation of the apparatus 118 of the present invention is otherwise very similar to that of the apparatus 18 of FIGS. 1-12. In this regard, the articles 146 is shrink wrapped by covering the article 146 with shrink film in the normal way, which is well known in the art; conveying covered article 146 on conveyer 12 through the shrink tunnel; holding the covered article 146 down by exerting pressure from at least one of the plurality of rollers; and blowing hot air on the shrink film covering the article 146 in a hot air chamber while the article 146 is held down by the at least one roller 20.

Furthermore, it will be appreciated that having a plurality of rollers 20 spaced apart from each other allows hot air to be blown in-between the rollers and around the article 146.

The cylinders 26 of the rollers 20 also may be disposed so as to rest upon the surface of conveyer 12, thereby imparting to each cylinder 26 rotational motion around its respective shaft 24 and further facilitating movement of the article 146 underneath each of the plurality of rollers 20 during movement of the conveyor 12. However, as will be appreciated, in order for all of the rollers 20 to be so driven by the conveyor 12, the diameters of the rollers 20 will differ between the rollers 20. It alternatively is contemplated that, while each of the rollers 20 preferably is disposed low enough to actually contact the particular article 146 to be shrink wrapped, it is possible to simply have rollers 20 disposed so as to be slightly positioned above the article 146 without actually contacting the article absent initial curling or deformation of the article, which would be sufficient to prevent the article 146 from curling or deforming more than a limited amount.

A characteristic of the apparatus 118 of FIGS. 13-18 is that the angle of the tapered opening created by the rollers 20 retained by the four subsets of slots 133,134,135,136 is fixed, i.e., the lowest point of slot 133 is vertically fixed relative to the lowest point of slot 134, the lowest point of slot 134 is vertically fixed relative to the lowest point of slot 135, and the lowest point of slot 135 is vertically fixed relative to the lowest point of slot 136.

In variations of the apparatus 118 of the first preferred embodiment, the cylinders of the rollers may include varying diameters (rather than uniform diameters as described) such that a tapered opening is not necessarily provided and such that the conveyor drives each of the rollers when disposed in its respective lowermost position. Nevertheless, because the height of the axes of rotation of at least the first couple of the rollers successively decreases, articles having a greater height still are accommodated generally as described above.

FIG. 19 is a right side elevational view of a second preferred embodiment 218 of an apparatus in accordance with the present invention. This apparatus 218 is similar to the first preferred embodiment 118 except that one or both of the side rails 128,130 of the first preferred embodiment have been replaced by a side member such as the right side rail 230 shown in FIG. 19. This side rail 230 includes slots all having a substantially uniform slot length, such as the fourth subset of slots 136; however, the apparatus 218 also includes an adjustable positioning arm 270 mounted at a pivot point 272. The arm 270 may have any one of various configurations so long as it serves the function of establishing a lower limit on the movement of the respective rollers 20 in one or more of the slots 136. Thus, an upper edge 274 of the arm 270 is arranged to receive and support the end of one or more of the roller shafts 24, as shown in FIG. 19. The arm 270 is held in place by tightening a fastener 276 at the pivot point 272.

The arm 270 additionally, or alternatively, may be further reinforced by a second fastener 278 inserted through a curved slot 280, located near the end of the arm 270 so as to optimize the moment of force relative to the pivot point 272. As shown, the slot 280 may be arranged in the body of the side rail 230, but it will be apparent that generally similar results may be achieved by locating the slot in the arm itself, provided that the arm is modified in such a way as to accommodate a slot 280 of suitable length. The second fastener 278 preferably includes a thumb screw with a relatively large diameter, thereby making adjustment thereof easier.

When the second fastener 278 is used, the first fastener 276 may remain loosened. In operation, the thumb screw of the second fastener 278 then only need be loosened enough to permit the arm 270 to be positioned at a desired angle. Once in place, the second fastener 278 is tightened so as to fix the lower range of movement of the roller shafts 24 in their respective slots 136. The apparatus 218 may then be used in like manner to the one shown in FIGS. 13-18. However, if unsatisfactory results are being achieved in the shrink wrapping operation, or if the size of the articles being shrink wrapped is changed beyond what otherwise can be accommodated by the prevailing setting, then the lower range of movement of the roller shafts 24 may be adjusted merely by loosening the thumb screw 278, repositioning the arm 270, and retightening the thumb screw 278.

The basic functionality of the present invention may also be accomplished in any of a variety of alternative configurations. For example, results similar to those achieved with the preferred embodiment 218 of FIG. 19 may be achieved by replacing the pivoting arm 270 illustrated therein with a member that may be moved up and down at each end, by a plurality of separate pivoting arms or members that each control the position of a portion of the roller shafts 24, or the like. Further, each movable end of a member or pivoting arm may be secured using a fastener inserted through a slot, as illustrated in FIG. 19, by a ratcheting mechanism, by a slot arrangement having a plurality of detent positions, or any other suitable attachment means.

Additionally, in variations of the apparatus 218 of the second preferred embodiment, the cylinders of the rollers may include varying diameters (rather than uniform diameters as described) such that a tapered opening is not necessarily provided and such that the conveyor drives each of the rollers when disposed in its respective lowermost position. Nevertheless, because the height of the axes of rotation of at least the first couple of the rollers successively decreases, articles having a greater height still are accommodated generally as described.

Figure 20:
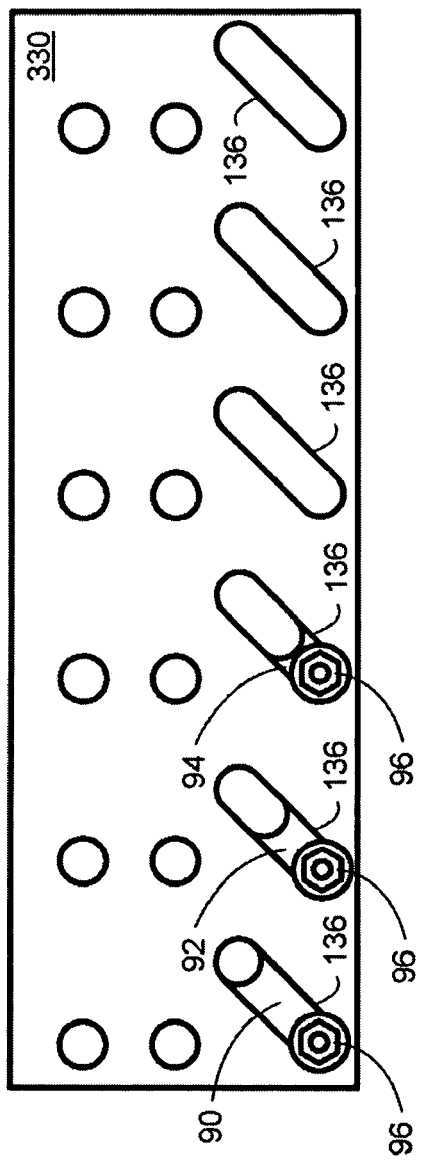
FIG. 20 is a right side elevational view of a side rail of a apparatus in accordance with a third preferred embodiment of the present invention.
Figure 21:
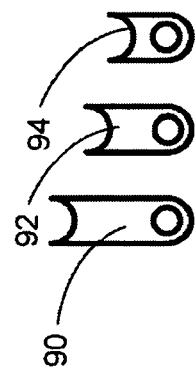
FIG. 21 is a right side view of the slot inserts of FIG. 20.

FIG. 20 illustrates a right side elevational view of a side rail 330 of yet a third preferred embodiment of an apparatus of the present invention (not shown). This side rail 330 is somewhat similar to the side rail 230 of FIG. 19, in that it includes slots all having a substantially uniform slot length, such as the fourth subset of slots 136. However, the side rail 330 includes one or more slot inserts 90,92,94 (more clearly shown in FIG. 21), each of which is retained in place by a fastener arrangement 96 such as, for example, a nut, washer, and bolt assembly. These inserts 90,92,94 may be installed or removed as necessary from the slots 136 nearest the front of the apparatus of which side rail 330 forms a part in order to control the lower range of movement of the roller shafts 24 in their respective slots 136. Different sizes or numbers of inserts may be used in order to produce tapered openings of different lengths or angles.

In variations of the apparatus of this third preferred embodiment, the cylinders of the rollers may include varying diameters (rather than uniform diameters as described) such that a tapered opening is not necessarily provided and such that the conveyor drives each of the rollers when disposed in its respective lowermost position. Nevertheless, because the height of the axes of rotation of at least the first couple of the rollers successively decreases, articles having a greater height still are accommodated generally as described.

Figure 22:
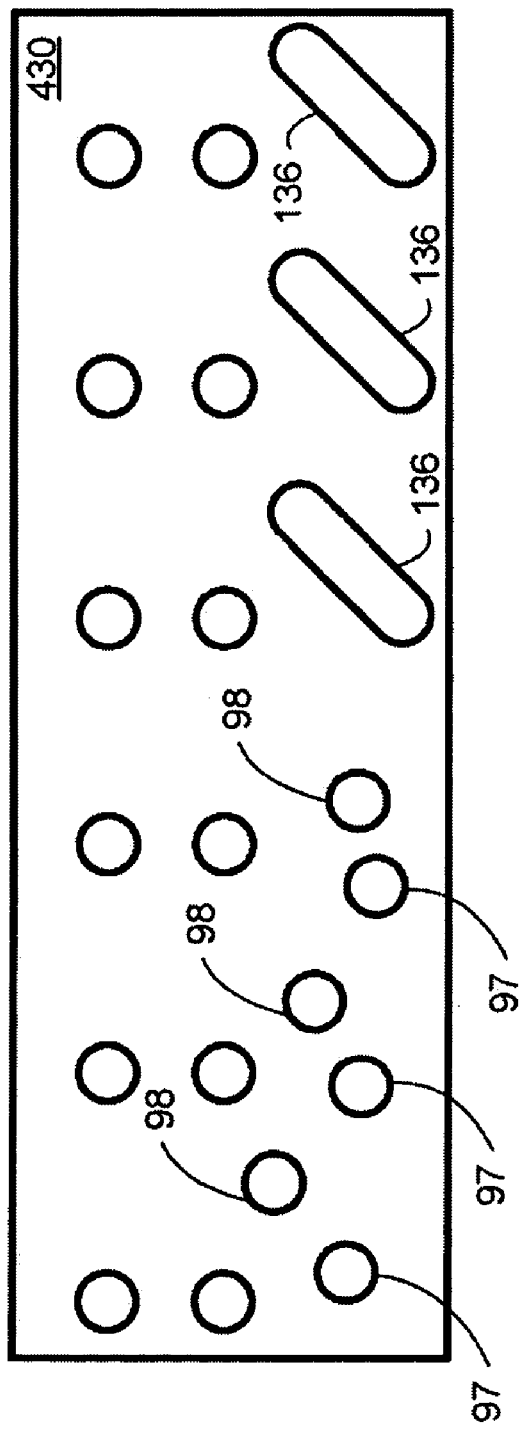
FIG. 22 is a right side elevational view of a side rail of a apparatus in accordance with a fourth preferred embodiment of the present invention.

FIG. 22 illustrates a right side elevational view of a side rail 430 of a fourth preferred embodiment of an apparatus (not shown) in accordance with the present invention. This side rail 430 also provides some adjustability to the length or angle of the tapered opening, which is accomplished via the inclusion of one or more series of holes 97,98 in a pattern that facilitates the creation of the tapered opening. As shown in FIG. 22, a first series of holes 97 creates a first line, generally collinear with the bottom of the first slot 136, while a second series of holes 98 creates a second line, also generally collinear with the bottom of the first slot 136. Rollers 20 inserted in either series of holes 97,98 thus form a gradual linear progression downward from high to low, thereby creating the tapered opening. Additional series of holes, or series having different numbers of holes, may likewise be used. The opening further need not be linear and may be curved. The arrangement provide, though, suffers from the disadvantage of not permitting movement of the rollers 20 in the series of holes 97,98, but provides for a tapered opening and adjustability of the angle or length of the opening that is provided.

In variations of the apparatus of this fourth preferred embodiment, the cylinders of the rollers may include varying diameters (rather than uniform diameters as described) such that a tapered opening is not necessarily provided and such that the conveyor drives each of the rollers when disposed in its respective lowermost position. Nevertheless, because the height of the axes of rotation of at least the first couple of the rollers successively decreases, articles having a greater height still are accommodated generally as described.

It will be apparent to the Ordinary Artisan that the relatively short side rails 130,230,330,430 shown in FIGS. 13-22 may represent merely an end section of a longer side rail. For example, FIG. 23 illustrates a right side elevational view of a portion of a long side rail that includes an end portion similar to the side rail 130 of FIG. 14. It also will be clear that the slot and hole arrangements described and illustrated above may be used in side rails of any length.

Alternatively, larger side rails may be constructed from shorter ones. For example, FIG. 24 is a right side elevational view of the side rail 130 of FIG. 14 connected to the side rail 30 of FIG. 6. Connection may be accomplished in any of a variety of ways, including but not limited to the connection plate 100 fastened to respective ends of the side rails 130,30 as shown in FIG. 24.

What is claimed is:

1. An apparatus for use in a shrink packaging machine for accommodating a greater height variance of articles, comprising:
    (a) a plurality of rollers, each roller including a shaft and a cylindrical member mounted on said shaft for rotation about an axis of said shaft; and
    (b) a frame including a pair of parallel side members generally extending in a first, horizontal direction and defining a plurality of slots receiving opposite ends of said shafts of said rollers for mounting of said rollers between said side members;
    (c) wherein each of said slots has a slot length that extends in a direction having both a component extending in the first, horizontal direction and a component extending in the second, vertical direction orthogonal to the first, horizontal direction;
    (d) wherein said rollers mounted between said side members each generally extends in a third direction orthogonal both to the first, horizontal direction and to the second, vertical direction;
    (e) wherein each of said rollers mounted between said side members is received within a pair of said slots and is vertically and horizontally displaceable between a respective uppermost position and a respective lowermost position within its respective said pair of slots; and
    (f) wherein each said roller is configured to first engage an article being shrink wrapped when in its respective lowermost position, and wherein the axes of said rollers do not all lie within a common horizontal plane when each said roller is disposed in its respective lowermost position within its respective said pair of slots.

2. The apparatus of claim 1, wherein the slot length of each a first subset of said plurality of slots is less than a slot length of each of a second subset of said plurality of slots.

3. The apparatus of claim 2, wherein said first subset of slots consists of a single slot.

4. The apparatus of claim 2, wherein said first subset of slots comprises a plurality of slots.

5. The apparatus of claim 1, wherein the slot length of each a first subset of said plurality of slots is less than a slot length of each of a second subset of said plurality of slots; wherein the slot length of each of the second subset of said plurality of slots is less than a slot length of each of a third subset of said plurality of slots; wherein said side members have opposed ends in the first, horizontal direction; and wherein the first subset of slots is disposed closer to a first said opposed end of said side members than said second subset of slots, and said second subset of slots is disposed closer to said first opposed end of said side members than said third subset of slots.

6. The apparatus of claim 1, wherein the lowermost position for each of a plurality of said rollers is defined by an insert that is adapted to be removably disposed within the respective slot, and wherein the inserts have different lengths for selectively limiting the range of movement of rollers within slots.

7. An apparatus for use in a shrink packaging machine for accommodating a greater height variance of articles, comprising
    (a) a first plurality of displaceable rollers, each displaceable roller including a shaft and a cylindrical member mounted on said shaft for rotation about an axis of said shaft; and
    (b) a frame including a pair of parallel side members generally extending in a first, horizontal direction and defining a plurality of slots receiving opposite ends of said shafts of said displaceable rollers for mounting of said displaceable rollers between said side members;

(c) wherein each of said slots has a slot length that extends in a direction having both a component extending in the first, horizontal direction and a component extending in the second, vertical direction orthogonal to the first, horizontal direction;

(d) wherein said displaceable rollers mounted between said side members each generally extends in a third direction orthogonal both to the first, horizontal direction and to the second, vertical direction; and (e) wherein each of said displaceable rollers mounted between said side members is received within a pair of said slots and is vertically and horizontally displaceable between a respective uppermost position and a respective lowermost position within said pair of said slots, each said displaceable roller being configured to first engage an article being shrink wrapped when in its respective lowermost position, the axes of said displaceable rollers being generally coplanar when each displaceable roller is in its respective lowermost position; and (f) further comprising a plurality of additional non-displaceable rollers, each non-displaceable roller including a shaft and a cylindrical member mounted on said shaft for rotation about an axis of said shaft, each non-displaceable roller being mounted between said side members in fixed disposition relative to said side members in both the first, horizontal direction and the second, vertical direction;

(g) wherein none of said axes of said non-displaceable rollers are generally coplanar with said axes of said first plurality of displaceable rollers when each displaceable roller is in its respective lowermost position.

8. The apparatus of claim 7, wherein said axes of said additional non-displaceable rollers are coplanar.

9. The apparatus of claim 7, wherein said axes of said additional non-displaceable rollers are not coplanar.

10. An apparatus for use in a shrink packaging machine for accommodating a greater height variance of articles, comprising:

(a) a plurality of displaceable rollers, each displaceable roller including a shaft and a cylindrical member mounted on said shaft for rotation about an axis of said shaft; and (b) a frame including a pair of parallel side members generally extending in a first, horizontal direction and defining a plurality of slots receiving opposite ends of said shafts of said displaceable rollers for mounting of said displaceable rollers between said side members;

(c) wherein each of said slots has a slot length that extends in a direction having both a component extending in the first, horizontal direction and a component extending in the second, vertical direction orthogonal to the first, horizontal direction;

(d) wherein said displaceable rollers mounted between said side members each generally extends in a third direction orthogonal both to the first, horizontal direction and to the second, vertical direction;

(e) wherein each of said displaceable rollers mounted between said side members is received within a pair of said slots and is vertically and horizontally displaceable between a respective uppermost position and a respective lowermost position within its respective said pair of slots;

(f) wherein each said displaceable roller is configured to first engage an article being shrink wrapped when in its respective lowermost position and the axes of said displaceable rollers do not all lie within a common horizontal plane when each said displaceable roller is disposed in its respective lowermost position; and (g) wherein the respective lowermost position of a said displaceable roller is selectively adjustable, independent of other of said displaceable rollers, for engaging an article at a predetermined height from a conveyor of a shrink wrapping machine.

11. The apparatus of claim 10, wherein the lowermost position of a said roller is defined by a blocking member.

12. The apparatus of claim 11, wherein the blocking member comprises an insert that is adapted to be removably positioned within the slot.

13. The apparatus of claim 12, wherein the blocking member comprises an arm that extends adjacent a plurality of said slots to define the lowermost position of each respective roller in each said slot.

14. The apparatus of claim 13, wherein the arm is pivotably mounted to a said side member.

* * * * *